UNITED STATES PATENT OFFICE.

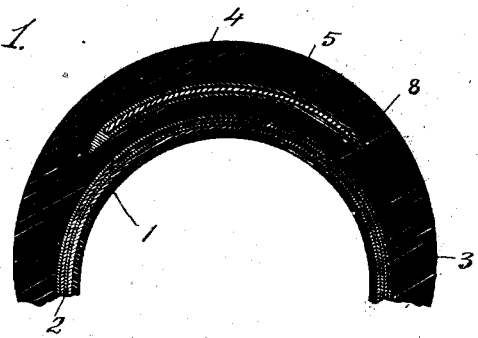
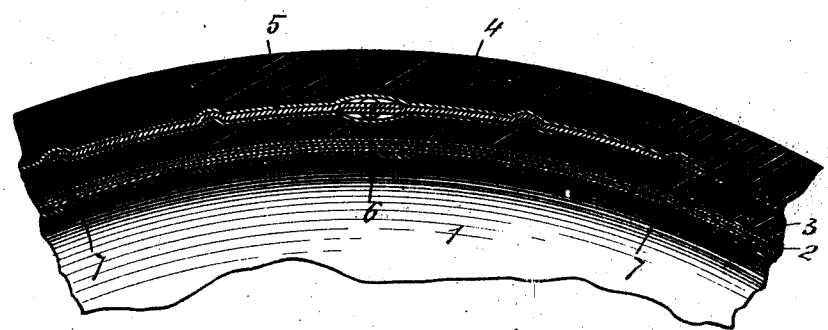
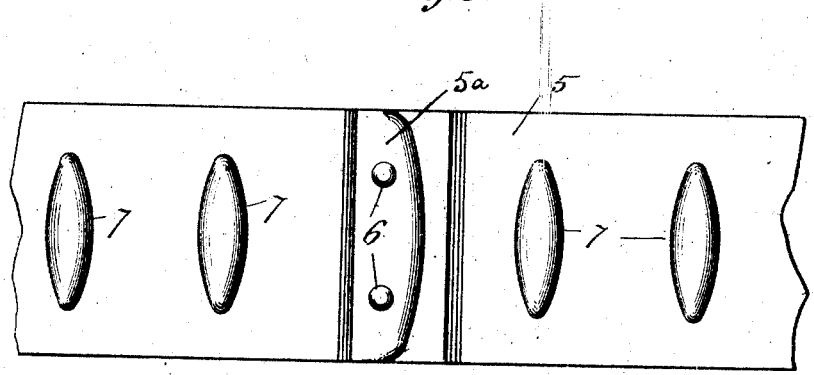

KNUT KARLSTRÖM AND GUSTAF HOLMQVIST, OF BUFFALO, NEW YORK.

TIRE.

No. 927,355.  Specification of Letters Patent.  Patented July 6, 1909.

Application filed May 6, 1908. Serial No. 431,159.

*To all whom it may concern:*

Be it known that we, KNUT KARLSTRÖM and GUSTAF HOLMQVIST, subjects of the King of Sweden, residing at Buffalo, in the county of Erie and State of New York, have invented certain new and useful Improvements in Tires, of which the following is a specification, reference being had therein to the accompanying drawing.

This invention relates to tires and more particularly to resilient tires for vehicles, as automobiles and the like.

The invention has for its primary object to provide a non-leakable, puncture proof tire, which shall retain all the essential qualities of the present type of tire, but capable of withstanding a greater internal pressure and considerable exterior damage.

The invention has for its further object to provide a composition tire wherein a plurality of elements are employed to give the tire sufficient resiliency, durability and strength, besides producing a non-penetratable tire that will withstand the rough usage to which tires of this type are subjected.

With the above and other objects in view which will readily appear as the invention is better understood, the same consists in the novel construction, combination and arrangement of parts to be presently described and claimed.

In the drawings, Figure 1 is a cross sectional view of a portion of a tire constructed in accordance with our invention. Fig. 2 is a longitudinal sectional view of a portion of our tire, and Fig. 3 is a plan of a portion of a metallic reinforcement used in connection with the tire.

In the accompanying drawings, 1 designates the inner tube of a tire which is protected by an outer tube, said outer tube comprising layers of canvas 2 covered with rubber 3, said rubber being formed to provide a tread 4 of greater thickness than the remainder of the outer tube. To reinforce the tread 4 of our tire, we use a metallic strip 5 having the ends thereof offset and overlapping as at 5ª and riveted or otherwise secured together, as at 6 to produce a band. The metallic strip 5 before having its ends connected together is bent to produce a convex formation, and is provided with a plurality of transverse, equally spaced oval shaped embossments 7. The metallic band is covered with canvas 8 and is embedded in the tread 4 when the outer tube is molded. The shape of the metallic band fully protects that portion of the inner tube that is liable to be punctured, while the canvas surrounding the metallic band prevents the edge of the band from cutting the rubber of the outer tube. In this connection, we reserve the right to use any fabric in lieu of the canvas. The embossment 7 prevents the band from shifting in the outer tube, besides strengthening the metallic band.

It is thought that the utility and roadability of our tire will be fully understood, and we reserve the right to make such structural changes as are permissible by the appended claim.

Having now described our invention what we claim as new, is;—

A tire comprising an outer tube consisting of a rubber body portion, a metallic band formed of a single strip of material embedded in said body portion and of convex curvature in cross section, said strip of material having the ends thereof offset and overlapping, means for securing the ends of the strip together, a band provided throughout with transversely extending oval-shaped embossments spaced from each other and of a length as to terminate at a point removed from each longitudinal edge of the band, and a canvas covering snugly fitting said metallic band throughout.

In testimony whereof we affix our signatures in the presence of two witnesses.

KNUT KARLSTRÖM.
GUSTAF HOLMQVIST.

Witnesses:
KARL KINDAHL,
J. ALBERT JOHNSON.